US012118367B1

(12) United States Patent
Suryanarayana et al.

(10) Patent No.: US 12,118,367 B1
(45) Date of Patent: Oct. 15, 2024

(54) ADAPTIVE GRAPHICS ACCELERATION IN PRE-BOOT

(71) Applicant: Dell Products L.P., Round Rock, TX (US)

(72) Inventors: Shekar Babu Suryanarayana, Bangalore (IN); Harish Barigi, Nellore District (IN)

(73) Assignee: Dell Products L.P., Round Rock, TX (US)

( * ) Notice: Subject to any disclaimer, the term of this patent is extended or adjusted under 35 U.S.C. 154(b) by 18 days.

(21) Appl. No.: 18/301,962

(22) Filed: Apr. 17, 2023

(51) Int. Cl.
*G06F 9/44* (2018.01)
*G06F 9/4401* (2018.01)

(52) U.S. Cl.
CPC .................. *G06F 9/4411* (2013.01)

(58) Field of Classification Search
CPC .... G06F 9/4411; G06F 9/4401; G06F 9/4403; G06F 9/4405; G06F 9/445
See application file for complete search history.

(56) References Cited

U.S. PATENT DOCUMENTS

| 2008/0162873 | A1* | 7/2008 | Zimmer | G06F 9/4405 712/22 |
| 2021/0049071 | A1* | 2/2021 | Suryanarayana | G06F 11/2284 |
| 2021/0256652 | A1* | 8/2021 | Suryanarayana | G09G 5/395 |

FOREIGN PATENT DOCUMENTS

WO    WO-2015150872 A1 * 10/2015    ......... G06F 13/4282

\* cited by examiner

*Primary Examiner* — David E Martinez
(74) *Attorney, Agent, or Firm* — Jackson Walker L.L.P.

(57) ABSTRACT

Disclosed subject matter enables early PEI phase initialization of GPU cores and dynamic configuration of the GPU core computing to accept sliced workloads for parallel execution. Disclosed methods dynamically adapt based on various factors to a graphics rendering context determined based on factors such as the connected monitors, their various resolutions, etc., to provide advanced GPU rendering in pre-boot operating environment. Methods and systems may support pre-boot hybrid graphics rendering including dynamic utilization of integrated and discrete GPU cards/memory, along with the central processing unit (CPU) and cache to provide seamless and faster graphics rendering operations for all preboot requirements.

18 Claims, 3 Drawing Sheets

ADAPTIVE GRAPHICS ACCELERATION IN PRE-BOOT

TECHNICAL FIELD

The present disclosure pertains to information handling systems and, more particularly, information handling systems provisioned with integrated and/or dedicated graphics processing units (GPUS).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Following a system reset, an information handling system may execute some form of boot sequence to initialize system hardware and boot or load an operating system. In some instances, the boot sequence complies with the Unified Extensible Firmware Interface (UEFI) set of standards. A UEFI boot sequence includes various phases that are well known to those of ordinary skill in the field. The operating environment of a system that is executing a boot sequence may be referred to as a pre-boot environment or, more simply, pre-boot.

Generally, it is challenging to render pre-boot display graphics, particularly during the earliest phases of a boot sequence, before hardware resources have been initialized. Nevertheless, original equipment manufacturers (OEMs) and independent software vendors (ISVs) may wish to convey corporate logos and/or other branding during pre-boot rather than displaying a blank or text-only screen. If, however, the rendering of pre-boot graphics results in a pre-boot that the end user perceives as being long or slow, this branding strategy may have an unintended negative consequence.

SUMMARY

Disclosed subject matter encompasses systems and methods to leverage the processing capability of GPUs during pre-boot to generate pre-boot graphics efficiently. GPUs may include hundreds of computational resources, referred to as cores, suitable for parallel processing applications. Disclosed subject matter enables and supports the initialization and effective use of a GPU's parallel compute resources to render pre-boot graphics including, without limitation, corporate logos and other branding images. Conventional techniques for preboot rendering of vendor logos on high resolution displays, including high definition (HD), ultra HD (UHD), full HD (FHD), 4K, etc., in a conventional hard disk boot path, are susceptible to undesirable delay due at least in part to scaling and re-rendering operations required for high resolution. At a driver execution environment (DXE) phase of a UEFI boot, it is generally not feasible to render high resolution graphics sufficiently quickly and rendering time varies as a function of the specific resolution. These issues may be amplified when, for example, a lid is opened or closed on a laptop or notebook system connected to one or more external monitors. Whereas a primary objective of branding is to inspire trust in the user, inefficient and/or inaccurate rendering of logos and other graphics can result in negative branding, i.e., inspiring mistrust, dissatisfaction, frustration, and the like. Similarly, attempts to provide graphics-rich features in pre-boot via advanced graphical widgets result in slow rendering.

Disclosed subject matter addresses the previously described issues with pre-boot graphics by enabling early pre EFI initialization (PEI) phase initialization of GPU cores and dynamic configuration of the GPU core computing to accept sliced workloads for parallel execution. Disclosed methods dynamically adapt based on various factors to a graphics rendering context including the connected monitors, their various resolutions, etc., to provide advanced GPU rendering. Methods and systems may support pre-boot hybrid graphics rendering including dynamic utilization of integrated and discrete GPU cards/memory, along with the central processing unit (CPU) and cache to provide seamless and faster graphics rendering operations for all preboot requirements.

In one aspect, disclosed systems and methods boot an information handling system by initializing, during a PEI stage of a UEFI boot sequence, a plurality of GPU cores. The GPU cores may include GPU cores associated with an integrated GPU (iGPU), a dedicated GPU (dGPU), or a combination of both. A plurality of graphics rendering common memory (GRCM) regions are defined and a sliced work node associated with the GRCM is created. An adaptive graphic acceleration protocol (AGAP) is invoked or otherwise implemented, to identify boot path jobs suitable for parallel execution. Responsive to identifying a boot path job suitable for parallel execution, disclosed methods and systems may initialize the sliced work node to accept multiple work nodes and create a plurality of sliced work nodes in a work queue. Methods and systems may execute, during a driver execution environment (DXE) phase of the UEFI boot sequence, the plurality work nodes at least partially in parallel by two or more of the GPU cores.

Defining the plurality of GRCM regions may include defining, during the PEI phase, a hand of block (HOB) indicative of the GRCM regions, the sliced work node, or both. In at least some such embodiments, identifying of boot path jobs eligible for parallel execution occurs during a DXE phase of the boot sequence. The AGAP may support and implement a boot path execution context event queue (CEQ) indicative of a series of context events including, as examples, internal display (ID) events, external display (ED) events, DXE driver events (DDE), network events (NE), and a UEFI-application events. The AGAP may select context events from the CEQ and provide the selected events to a graphics work load queue. The AGAP may maintain a GPU job creation table mapped to a GPU. In such embodiments, the GPU may acquire jobs from the AGAP via the job creation table. After GPU processing of a task is completed, the processed data may be provided to a completion queue.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
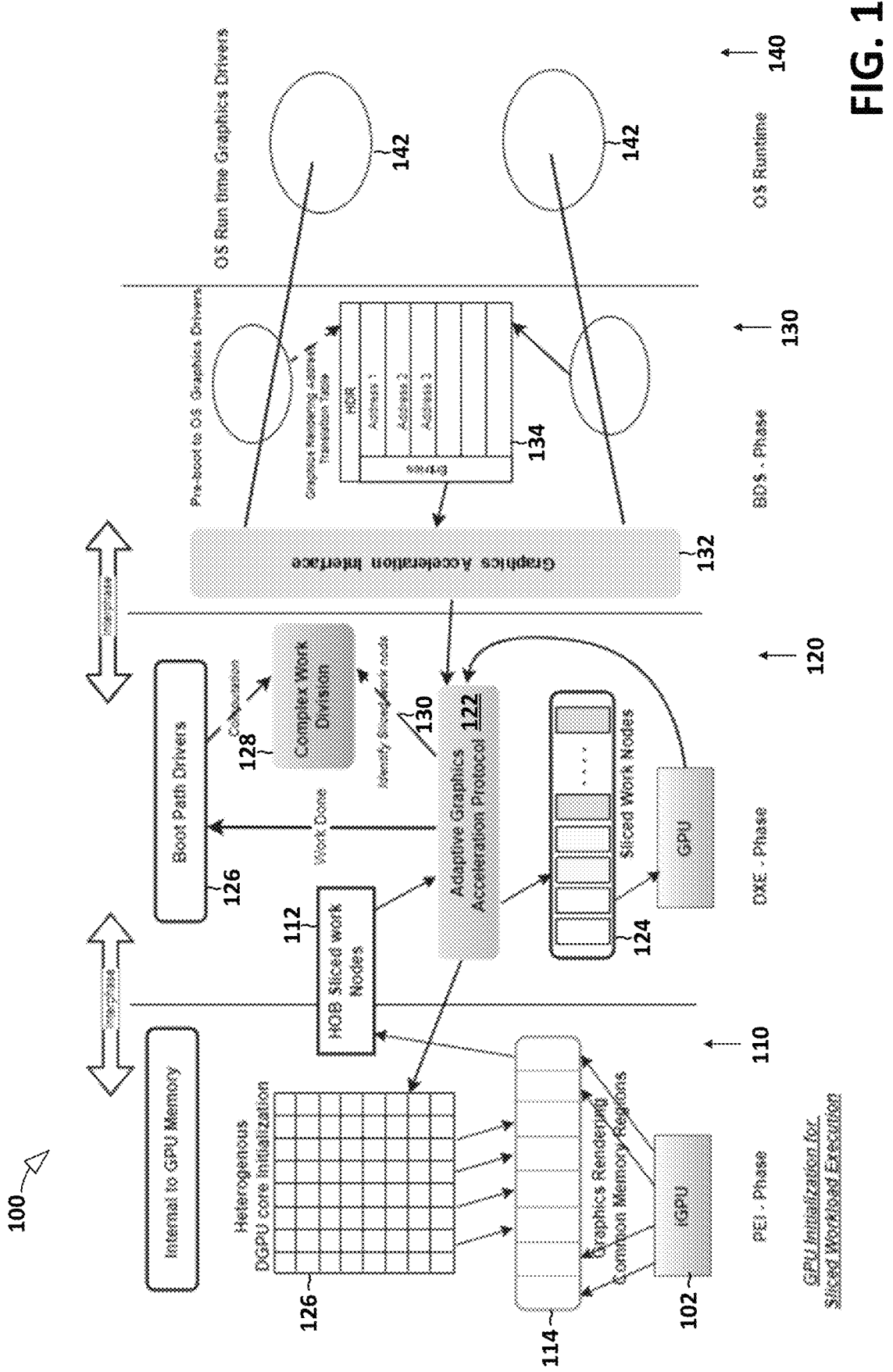
FIG. 1 illustrates aspects of a UEFI boot sequence in accordance with disclosed subject matter for adaptive pre-boot graphics acceleration.

Exemplary embodiments and their advantages are best understood by reference to FIGS. 1-5, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Consistent with an ongoing emphasis on improving user experience and achieving faster boot times, disclosed subject matter enables rendering of advanced graphics in pre-boot and reduces delay in graphical rendering in boot path. A disclosed adaptive graphics acceleration protocol enables context-specific graphics rendering for finer and faster resolutions. A disclosed hybrid rendering mode leverages system CPU and GPU compute capabilities to provide seamless video capabilities in pre-boot.

Referring now to the drawings, FIG. 1 illustrates an exemplary UEFI boot sequence 100 implementing pre-boot adaptive graphics acceleration features. The illustrated UEFI boot sequence performs graphics initialization, as part of an early PEI boot phase, to GPU cores and dynamically prepares the GPU cores to accept sliced workloads for parallel execution. In at least some embodiments, the boot sequence 100 implements an AGAP for dynamically adapting to a context of the graphics rendering, based on various factors, e.g., connected monitors, various resolutions, etc. to provide advanced pre-OS rendering.

As depicted in FIG. 1, UEFI boot sequence 100 includes a pre-EFI initialization (PEI) phase 110, a driver execution environment (DXE) phase 120, a boot device selection (BDS) phase 130, and an operating system (OS) runtime phase 140. Significantly, the illustrated sequence 100 includes early-phase initialization of graphics resources. More specifically, the UEFI boot sequence 100 depicted in FIG. 1 initializes GPU resources as part of PEI phase 110 and creates a hand off block (HOB), referred to herein as a sliced work nodes HOB 112, identifying graphics-rendering common memory regions 114. A dGPU core initialization is performed to handle silicon vendors such as Intel, AMD, and NVDIA. Heterogeneous dGPU Core Initialization logic 126 then initializes dGPU portions of graphics rendering common memory regions 114.

Once this initialization is complete, the memory regions 114 associated with iGPU 102 and DGPU are mapped to the Sliced Common Graphics Rendering Memory region 114. Memory Internal to GPU for both iGPU and dGPU is mapped for internal core memory as extended cache.

In DXE phase 120, an AGAP 122 is initialized and loaded to handle the DXE Services to dynamically identify boot path jobs that can be converted to run in a parallel execution mode. Once a job is identified, GPU Sliced work nodes 124 are initialized to accept multiple work nodes, thereby enabling one handler to handle multiple work nodes.

AGAP 122 creates sliced work nodes 124 in the work queue mapped in common memory region, where the iGPU and dGPU can both pick a job and mark the execution status. Control is managed by AGAP 122, which can grant control to a GPU for execution. Once GPU execution completes, the GPU-processed nodes data may be given back to AGAP 122, e.g., by a Get operation, and AGAP 122 may then give control to boot path drivers 126.

Boot path drivers 126 may access complex work division 128, which is where division may occur. AGAP 122 may then identify (130) the sliced work nodes and control will pass to boot path drivers 126.

Figure 3:
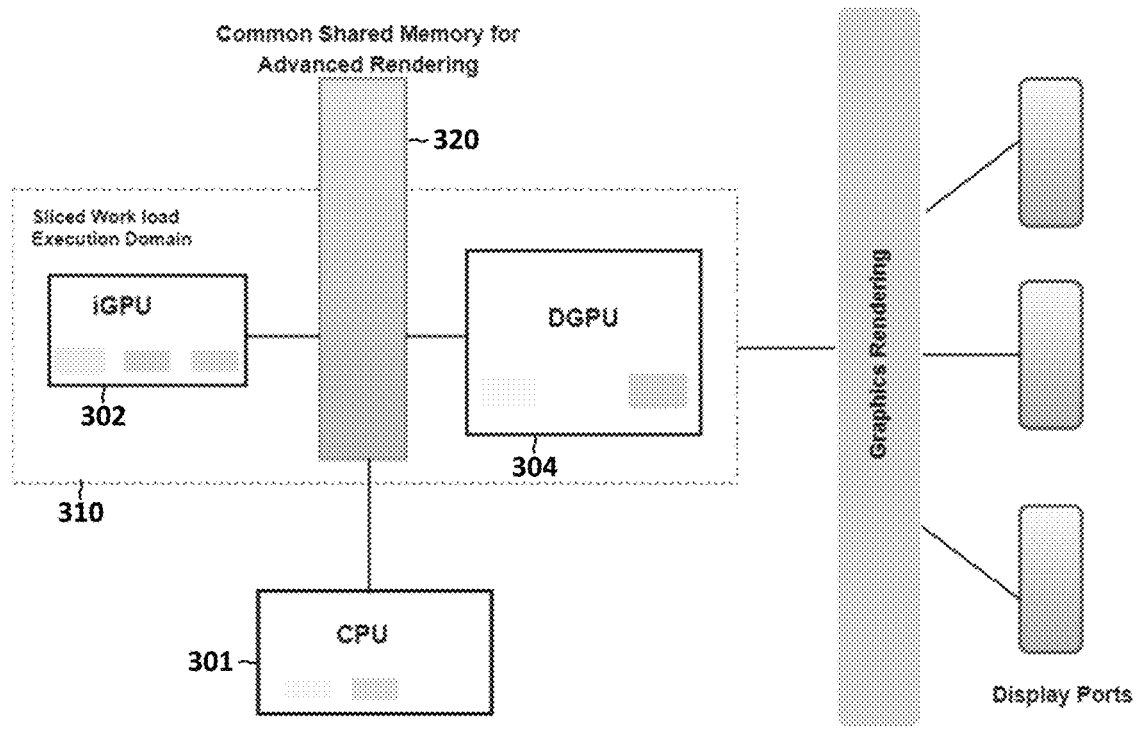
FIG. 3 illustrates a common, shared memory feature suitable for advanced pre-boot graphics rendering.

In the BDS phase 130 illustrated in FIG. 1, A graphics acceleration interface 132 is created so that any OS runtime objects may make use of it for a graphics rendering operation. A table 134 for translating a graphics rendering address (GRA) is created and mapped for GRA Translations, this will be interfaced with Pre-Boot Objects as depicted in FIG. 3 below.

At OS Runtime 140, graphics drivers 142 access a graphics acceleration interface (GAI) and get the translations for Pre-Boot OS Graphic Drivers over the GRA Table to get the work execution in queue by Adaptive Acceleration Protocol. Any pre-boot job can now be sliced into granular jobs and seeded over the GPU core execution and AGAP managed the execution and completion status and aggregates the results to enable faster boot path operations.

Figure 2:
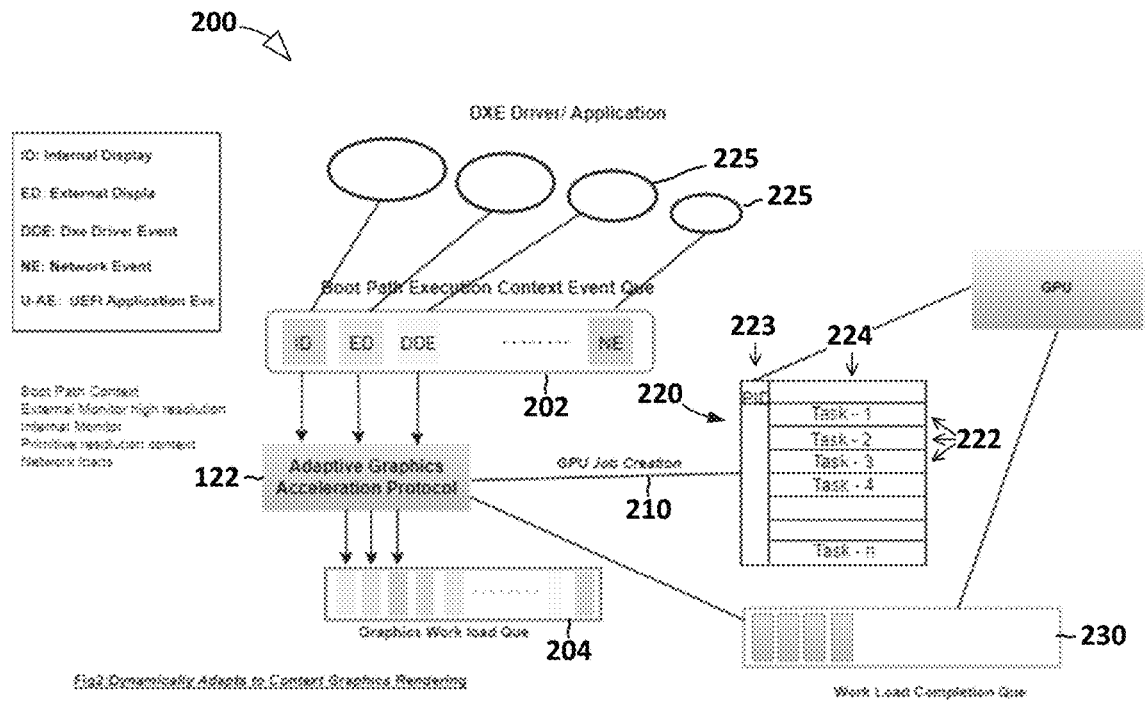
FIG. 2 illustrates dynamic context-driven adaptation of the pre-boot graphics rendering.

Referring now to FIG. 2, AGAP 122 implements a context event queue 202 which may contain a series of context events such as an internal display (ID) event, external display (ED) event, DXE driver (DDE) event, a network event (NE) and a UEFI-application event. AGAP 122 may prepare a graphics workload queue 204, and this data may be updated to the table.

AGAP 122 may perform GPU job creation operations 210 and maintain the created jobs in a table 220 including entries 222, each of which may include a process identifier (PID) 223 and a name 224, e.g., Task-1, Task-2, Task-3 - - - - Task-n. The tasks-maintained table 220 may be mapped to a GPU that will get jobs from AGAP 122 via tasks table 220. In at least some embodiments, AGAP 122 can give multiple jobs at a time.

After the applicable GPU processes a task, it may store processed data to a workload completion que 230. After que 230 is processed, it may be given back to AGAP 122, which may write an event back to the boot path execution context event que 202. Thus event que 202 may produce at least some input events and at least some output events.

Drivers/Applications 225 will access completion events from the CEQ 202, indicating that the applicable job (e.g., ID, ED events) is done. Alternatively, the CEQ may contain events. The context depends on heterogeneous boot path.

Referring now to FIG. 3, advanced rendering with sliced workload execution is depicted. Different processing units like CPU 301, iGPU 302, and DGPU 304 may be mapped over a common shared memory for advanced rendering (320). Each graphics processing unit may contain its own internal context buffers and CPU 301 may contain a cache memory buffer. This is a common memory region index for in node distributed computing.

iGPU 302 and DGPU 304 may be entirely managed by graphics rendering current objects table (GRCT) entries loaded in the sliced workload execution domain. This domain may have a protocol to enable control to the graphic rendering unit and the graphic rendering unit, will do whatever the context data obtained from the iGPU and DGPU context data indicate including, as an example, processing content and sending it to external display ports as shown. Based on the above process iGPU 302, DGPU 304 and CPU 301 cache may provide seamless & faster graphics rendering operation for all pre-boot requirements.

Figure 4:
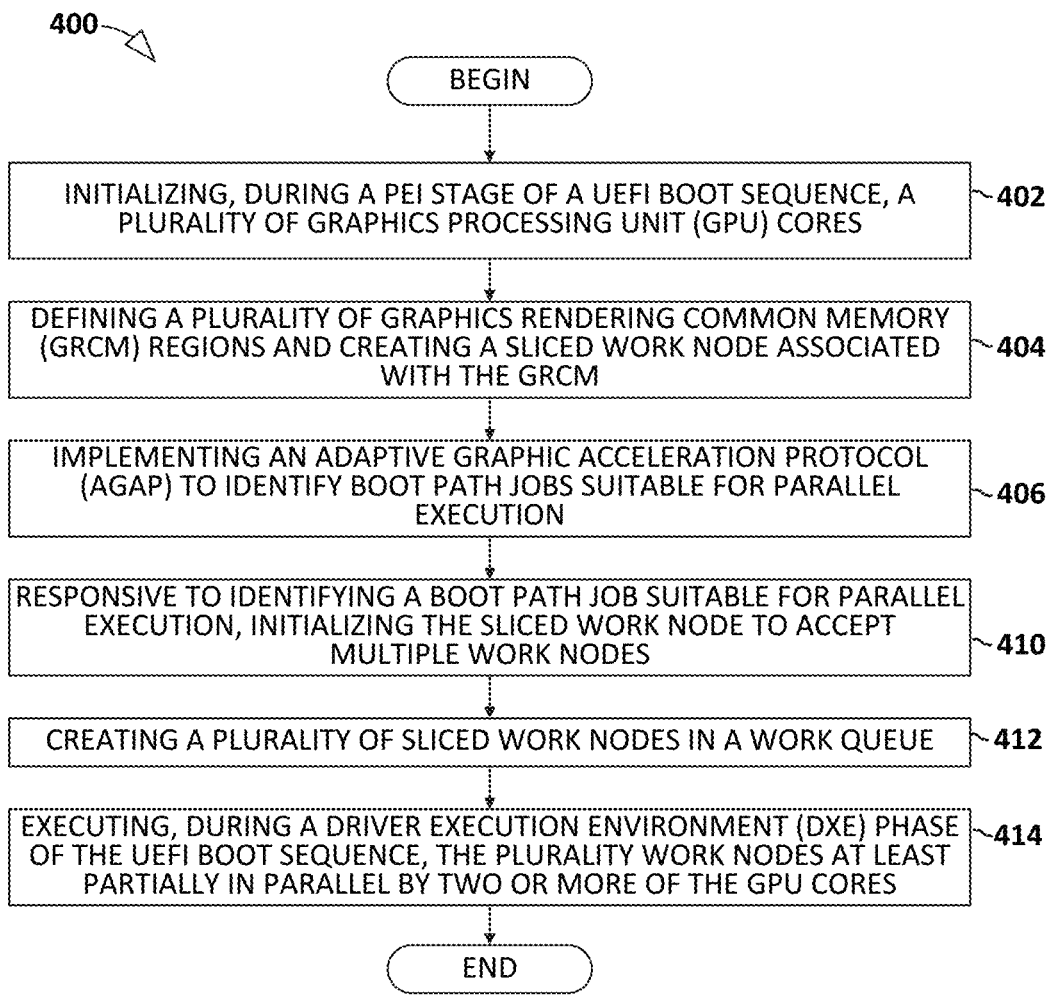
FIG. 4 illustrates a flow diagram of a method for booting an information handling system.

Turning now to FIG. 4, a flow diagram illustrates a method 400 for implementing accelerated graphics processing in a pre-boot operating environment. The illustrated method 400 includes initializing (402), during a PEI stage of a UEFI boot sequence, a plurality of GPU cores and defining (404) a plurality of GRCM regions and creating a sliced work node associated with the GRCM. The previously described AGAP is then implemented (406) to identify boot path jobs suitable for parallel execution. As depicted in FIG. 4, responsive to identifying a boot path job suitable for parallel execution, the sliced work node is initialized (410) to accept multiple work nodes and a plurality of sliced work nodes are created (412) in a work queue. During a DXE phase of the boot sequence, the two or more of the plurality work nodes are executed at least partially in parallel.

Figure 5:
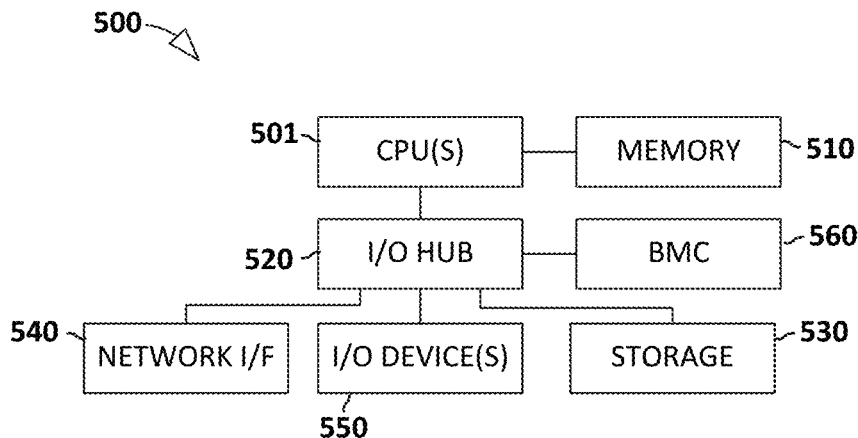
FIG. 5 illustrates an information handling system suitable for use in conjunction with subject matter illustrated in FIGS. 1-3 and described in the accompanying text.

Referring now to FIG. 5, any one or more of the elements illustrated in FIG. 1 through FIG. 4 may be implemented as or within an information handling system exemplified by the information handling system 500 illustrated in FIG. 5. The illustrated information handling system includes one or more general purpose processors or central processing units (CPUs) 501 communicatively coupled to a memory resource 510 and to an input/output hub 520 to which various I/O resources and/or components are communicatively coupled. The I/O resources explicitly depicted in FIG. 5 include a network interface 540, commonly referred to as a NIC (network interface card), storage resources 530, and additional I/O devices, components, or resources 550 including as non-limiting examples, keyboards, mice, displays, printers, speakers, microphones, etc. The illustrated information handling system 500 includes a baseboard management controller (BMC) 560 providing, among other features and services, an out-of-band management resource which may be coupled to a management server (not depicted). In at least some embodiments, BMC 560 may manage information handling system 500 even when information handling system 500 is powered off or powered to a standby state. BMC 560 may include a processor, memory, an out-of-band network interface separate from and physically isolated from an in-band network interface of information handling system 500, and/or other embedded information handling resources. In certain embodiments, BMC 560 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for booting an information handling system, the method comprising:
    initializing, during a pre EFI initialization (PEI) stage of a universal extensible firmware interface (UEFI) boot sequence, a plurality of graphics processing unit (GPU) cores;
    defining a plurality of graphics rendering common memory (GRCM) regions and creating a sliced work node associated with the GRCM;
    implementing an adaptive graphic acceleration protocol (AGAP) to identify boot path jobs suitable for parallel execution;
    responsive to identifying a boot path job suitable for parallel execution, initializing the sliced work node to accept multiple work nodes;
    creating a plurality of sliced work nodes in a work queue; and
    executing, during a driver execution environment (DXE) phase of the UEFI boot sequence, the plurality work nodes at least partially in parallel by two or more of the GPU cores.

2. The method of claim 1, wherein defining the plurality of GRCM regions includes defining, during the PEI phase, a hand of block (HOB) indicative of at least one of: the GRCM regions and the sliced work node.

3. The method of claim 2, further comprising: the identifying of the boot path job eligible for parallel execution occurs during a DXE phase of the boot sequence.

4. The method of claim 1, wherein the AGAP implements a boot path execution context event queue (CEQ) indicative of a series of context events wherein the context events include events selected from: internal display (ID) events, external display (ED) events, DXE driver events (DDE), network events (NE), and a UEFI-application events.

5. The method of claim 4, wherein the AGAP selects context events from the CEQ and provides the selected events to a graphics work load queue.

6. The method of claim 5, wherein the AGAP maintains a GPU job creation table mapped to a GPU, and wherein the GPU acquires jobs from the AGAP via the job creation table.

7. The method of claim 6, further comprising, after GPU processing of a task, providing data processed to a completion queue.

8. The method of claim 1, wherein the GRCM regions include GRCM regions associated with an integrated GPU (iGPU) of the information handling system.

9. The method of claim 1, wherein the GRCM regions include regions include GRCM regions associated with a dedicated GPU (dGPU).

10. An information handling system, comprising:
    a central processing unit;
    one or more graphics processing units; and
    a computer readable memory, accessible to the processor, including process-executable instructions that, when executed by the CPU, cause the system to perform boot sequence operations including:
        initializing, during a pre EFI initialization (PEI) stage of a universal extensible firmware interface (UEFI) boot sequence, a plurality of graphics processing unit (GPU) cores;
        defining a plurality of graphics rendering common memory (GRCM) regions and creating a sliced work node associated with the GRCM;
        implementing an adaptive graphic acceleration protocol (AGAP) to identify boot path jobs suitable for parallel execution;
        responsive to identifying a boot path job suitable for parallel execution, initializing the sliced work node to accept multiple work nodes;
        creating a plurality of sliced work nodes in a work queue; and
        executing, during a driver execution environment (DXE) phase of the UEFI boot sequence, the plurality work nodes at least partially in parallel by two or more of the GPU cores.

11. The information handling system of claim 10, wherein defining the plurality of GRCM regions includes defining, during the PEI phase, a hand of block (HOB) indicative of at least one of: the GRCM regions and the sliced work node.

12. The information handling system of claim 11, further comprising: the identifying of the boot path job eligible for parallel execution occurs during a DXE phase of the boot sequence.

13. The information handling system of claim 10, wherein the AGAP implements a boot path execution context event queue (CEQ) indicative of a series of context events wherein the context events include events selected from: internal display (ID) events, external display (ED) events, DXE driver events (DDE), network events (NE), and a UEFI-application events.

14. The information handling system of claim 13, wherein the AGAP selects context events from the CEQ and provides the selected events to a graphics work load queue.

15. The information handling system of claim 14, wherein the AGAP maintains a GPU job creation table mapped to a GPU, and wherein the GPU acquires jobs from the AGAP via the job creation table.

16. The information handling system of claim 15, further comprising, after GPU processing of a task, providing data processed to a completion queue.

17. The information handling system of claim 10, wherein the GRCM regions include GRCM regions associated with an integrated GPU (iGPU) of the information handling system.

18. The information handling system of claim 10, wherein the GRCM regions include regions include GRCM regions associated with a dedicated GPU (dGPU).

* * * * *